No. 851,438. PATENTED APR. 23, 1907.
A. RHONEMUS.
FURNACE.
APPLICATION FILED AUG. 8, 1906.
2 SHEETS—SHEET 1.
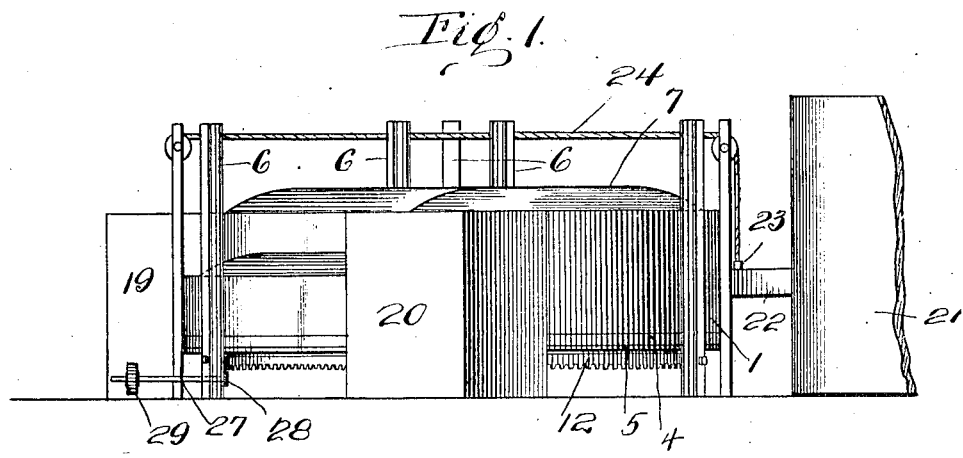
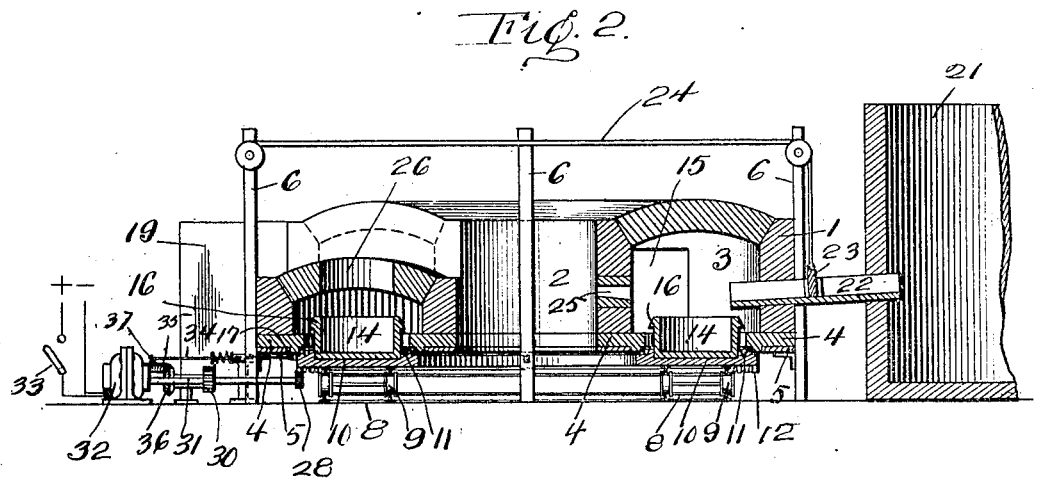
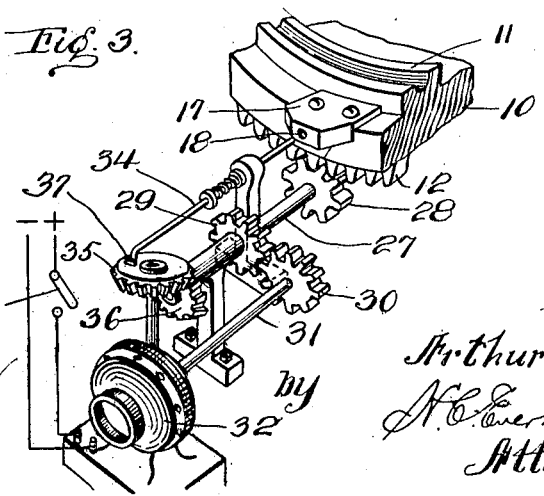

No. 851,438. PATENTED APR. 23, 1907.
A. RHONEMUS.
FURNACE.
APPLICATION FILED AUG. 8, 1906.
2 SHEETS—SHEET 2.
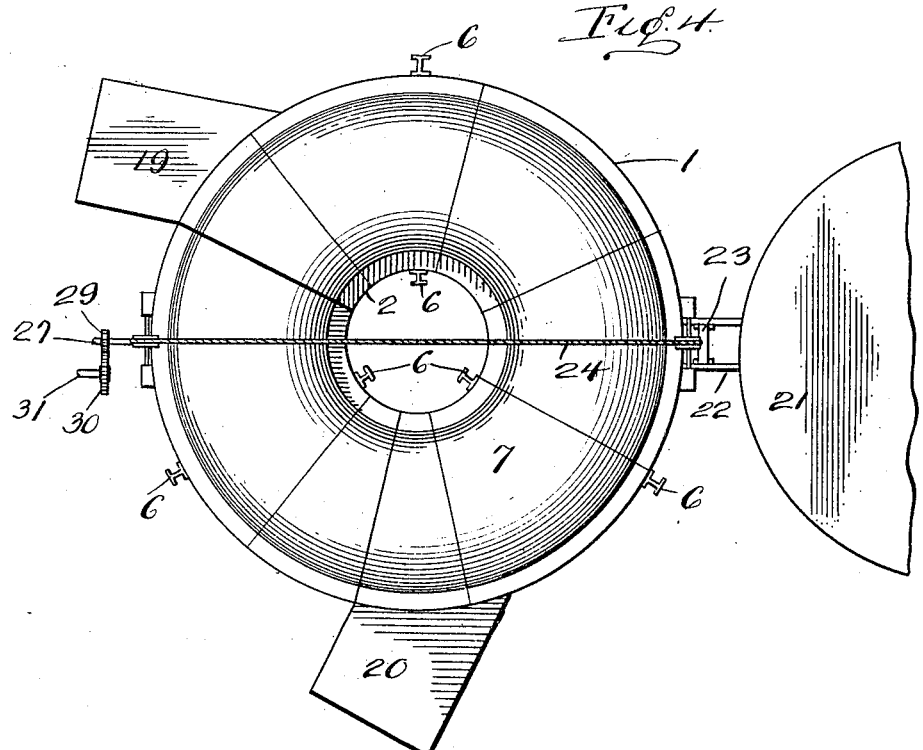
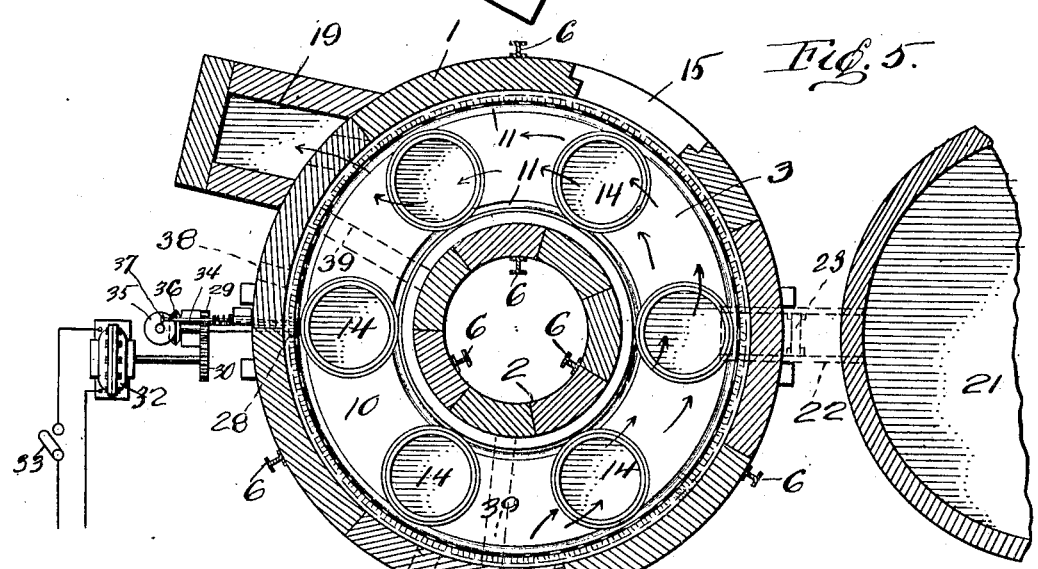
Witnesses
Samuel Payne
Inventor
Arthur Rhonemus
by
Attorneys.

UNITED STATES PATENT OFFICE.

ARTHUR RHONEMUS, OF BELLE VERNON, PENNSYLVANIA.

FURNACE.

No. 851,438.  Specification of Letters Patent.  Patented April 23, 1907.

Application filed August 8, 1906. Serial No. 329,793.

*To all whom it may concern:*

Be it known that I, ARTHUR RHONEMUS, a citizen of the United States of America, residing at Belle Vernon, in the county of Fayette and State of Pennsylvania, have invented certain new and useful Improvements in Furnaces, of which the following is a specification, reference being had therein to the accompanying drawing.

This invention relates to certain new and useful improvements in glass furnaces, and more particularly to a furnace designed for producing cylinder and plate glass.

The primary object of this invention is to provide a furnace wherein pots of molten glass can be continuously heated.

Another object of this invention is to provide a furnace that can be easily and quickly manipulated and regulated to produce molten glass of a proper consistency and temperature to be formed into a cylinder or plate of glass. To this end, I have devised a circular furnace having a circular compartment formed therein. In the compartment travels a platform carrying a plurality of pots adapted to convey glass through a heating zone, which prepares the glass to be drawn from the furnace. In connection with the furnace, I use certain mechanism, for moving the platform and automatically stopping the same in short periods of time.

The detail construction of the furnace will be presently described, illustrated and specifically pointed out in the appended claims.

Referring to the drawing forming part of this specification, like numerals of reference designate corresponding parts throughout the several views, in which—

Figure 1 is a side elevation of my improved furnace, Fig. 2 is a vertical sectional view of the furnace, Fig. 3 is a detail perspective view of the operating mechanism, Fig. 4 is a plan of the furnace, and Fig. 5 is a horizontal sectional view of the same.

To put my invention into practice, I construct my improved furnace of two circular walls 1 and 2, the wall 2 being of a lesser diameter than the wall 1, thereby forming a circular heating compartment 3. The walls 1 and 2 are constructed of a plurality of sections supported by plates 4 mounted upon brackets 5, carried by a plurality of standards 6 conveniently arranged with relation to the walls 1 and 2. The walls support a convex roof 7 composed of a plurality of sections. The height of the compartment 3 varies, approximately one-fourth of the compartment being lower and smaller than the remaining three-fourths, the object of which will be presently described.

The walls 1 and 2 are supported above the ground or foundation of the furnace, and directly beneath the compartment 3, I arrange a circular track 8, upon which a plurality of trucks 9 travel, said trucks carrying a circular platform 10 having circumferentially arranged gutters 11 bordering its edges. The bottom outer edges of the platform are provided with a circular rack 12 by which the platform is driven. Upon the platform 10 are mounted a plurality of pots 14, said pots being placed thereon through an opening 15 formed in the wall 1, which is suitably closed during the operation of the furnace. The pots 14 are provided with gripping lugs 16, whereby a pair of tongs or a suitable implement or instrument can be used for removing the pots from the furnace, and opposite each pot, I provide the platform 10 with a plate 17 having an opening 18 formed therein. These plates are employed in connection with the operating mechanism of the furnace.

Arranged tangentially to the furnace are two flues 19 and 20, the flue 20 serving as an inlet flue for a blast of gas, while the flue 19 serves as an outlet or exhaust for the gas. The flues are arranged at the ends of the lower portion of the furnace, whereby the gas will be driven through the large compartment or the heating zone, as indicated by arrows. Some heat will pass through the small part of the compartment 3, but the glass placed in the pots 14 will be subjected to the greater heat in the large part of the compartment.

The molten glass to be treated in my furnace is conveyed from a suitable tank 21 to the pots 14 by a trough 22, said trough having a suitable gate 23, which is controlled by a cable or chain 24 that passes over the furnace and is manipulated by an attendant when a pot is filled. I provide the wall 2 opposite the trough with a peep hole 25, whereby an attendant in front of the small part of the compartment 3 can look over the same, through the hole 25 and observe the flow of the glass in the trough 22. The glass after it has been subject to the heat of the furnace is drawn through an opening 26, formed in the roof 7 of the furnace, said opening being located above the small part of the furnace.

To revolve the platform 10 and stop the same at predetermined times to allow the pots to be filled, and the glass drawn, I journal a shaft 27 adjacent to the furnace, said shaft carrying pinions 28 and 29, the former meshing with the rack 12, while the latter meshes with a gear wheel 30 mounted upon the armature shaft 31 of a conventional form of motor 32. The motor 32 is controlled by a switch 33. Contiguous to the shaft 27 I mount a spring held rod 34, the end of which is adapted to enter the openings 18 of the plates 17. To move the rod 34, I use a bevel gear wheel 35, which meshes with a gear wheel 36 mounted upon the shaft 27. The bevel gear wheel 35 is provided with a lug 37 adapted to strike the end of the rod 34 and move its end into the plates 17.

In Fig. 5 of the drawings, I have illustrated in dotted lines two openings 38, which are normally closed while the furnace is in operation. These openings are used in case the glass has not been sufficiently heated a suitable burner being placed in the openings 38 over the pots 14, to heat the glass contained in said pots. I have also illustrated in dotted lines two partitions 39, which can be conveniently used to shield the smaller compartment from the gas of the flue 20, while the pots contained within the smaller compartment are being operated upon.

In operation, the heating of glass within my improved furnace is practically continuous, as the molten glass is fed into the furnace at one side and drawn from another side of the furnace, while the platform of the furnace continues to revolve, carrying the molten glass through the heating zone, where it is subjected to the heat of the ignited gas, which passes through a portion of the furnace. An attendant is adapted to operate the furnace and control the movement of the platform by the electrical switch of the motor. I provide the revoluble platform of the furnace with gutters, to receive any molten glass that may overflow from the pots carried by the platform, these gutters preventing the glass from sealing the pots upon the platform.

I do not care to confine myself to the mechanism employed for stopping the platform, to permit of the pots carried thereby being refilled and drawn. It is obvious that various mechanical expedients may be readily used in lieu of the mechanism shown, and I desire it to be understood that such other changes in the details of construction, as are permissible by the appended claims, may be resorted to without departing from the spirit and scope of the invention.

What I claim and desire to secure by Letters Patent, is:—

1. A furnace of the type described, consisting of two circular walls forming a circular compartment, one part of said compartment being smaller than the remainder of the compartment, a circular track arranged beneath said compartment, a revolving platform adapted to travel upon said track and having gutters at its edges, pots mounted upon said platform, tangentially disposed flues communicating with said compartment and adapted to establish a heating zone therein, and means to revolve said platform, substantially as described.

2. In a furnace, the combination with a suitable heating medium, of circular walls forming a circular compartment adapted to be heated by said medium, one part of said compartment being smaller than the remainder of the compartment, a circular platform revolubly mounted in said compartment and having gutters at its edges, pots arranged upon said platform and adapted to receive molten glass, means to revolve said platform, and means to intermittently stop said platform, substantially as described.

3. In a furnace, the combination with a suitable heating medium, of circular walls forming a compartment adapted to be heated by said medium, one part of said compartment being smaller than the remainder of the compartment, a roof for said compartment having an opening formed therein, a revoluble platform mounted in said compartment, pots supported by said platform and adapted to receive molten glass, means to revolve said platform, and means engaging said platform opposite each pot to stop said platform, substantially as described.

4. A furnace embodying two circular walls, one arranged within the other to form a circular compartment, tangentially disposed flues communicating with said compartment and adapted to establish a heating zone therein, a revoluble platform mounted in said compartment, pots mounted upon said platform, and means to revolve said platform, substantially as described.

5. A furnace formed of an inner and an outer circular wall forming a circular compartment, the walls at one point being of materially less height than at the remainder thereof, forming a circular compartment of different areas in cross section, a roof for said compartment having an opening located over that part of the compartment which is of the less area in cross section, and flues communicating with that part of the compartment which is of the greater area in cross section.

6. A furnace constructed of circular walls one within the other forming a circular heat zone or compartment, the walls at one point in the furnace being of materially less height than the remainder of the walls, and flues communicating with the heat zone or compartment at the ends of the larger part of said compartment.

7. In a furnace of the type described, a furnace chamber of endless form and of less area in cross section at one point than throughout the remainder of the chamber, the roof of said chamber having an opening located above that portion of the chamber which is of the less area in cross section.

8. In a furnace of the type described, a furnace chamber of endless form and of less area in cross section at one point than throughout the remainder of the chamber, the roof of said furnace chamber having an opening located above that portion of the chamber which is of less area in cross section, and the side wall of said furnace having an opening communicating with that portion of the furnace which is of the greater area in cross section.

In testimony whereof I affix my signature in the presence of two witnesses.

ARTHUR RHONEMUS.

Witnesses:
MICHAEL E. BROWN,
JAMES BLACK.